United States Patent [19]

Edmonds

[11] Patent Number: 4,471,208
[45] Date of Patent: Sep. 11, 1984

[54] ELECTRODES FOR WELDING
[75] Inventor: Terence G. Edmonds, Preston, England
[73] Assignee: British Nuclear Fuels Limited, Warrington, England
[21] Appl. No.: 386,061
[22] Filed: Jun. 7, 1982
[30] Foreign Application Priority Data Jun. 10, 1981 [GB] United Kingdom ............... 8117846

[51] Int. Cl.³ .......................................... B23K 35/02
[52] U.S. Cl. ............................... 219/145.21; 219/75
[58] Field of Search ............... 219/145.21, 145.1, 75, 219/136, 119

[56] References Cited

U.S. PATENT DOCUMENTS

| 3,019,330 | 1/1962 | Guida | 219/145.21 |
| 3,399,322 | 8/1968 | Ambe | 219/145.21 |
| 3,780,259 | 12/1973 | Meyer | 219/145.21 |
| 4,103,143 | 7/1978 | Yamauchi et al. | 219/145.21 |

Primary Examiner—Roy N. Envall, Jr.
Assistant Examiner—Alfred S. Keve
Attorney, Agent, or Firm—William R. Hinds

[57] ABSTRACT

A welding electrode comprises an elongate body with a cavity or cavities at one end thereof. The geometry of the cavity or cavities can range from a single simple slot arranged to extend along a diameter of the electrode tip and in the axial direction to terminate short of the region where the taper of the electrode tip commences, to complex cavities such as multi slots. Electrodes according to the invention serve to mitigate the problem of their becoming coated with metal vaporized from the surface of the weld pool.

6 Claims, 4 Drawing Figures

ELECTRODES FOR WELDING

BACKGROUND OF THE INVENTION

This invention relates to electrodes, in particular, though not exclusively, to electrodes for use in low current tungsten inert gas welding. In such welding, a problem that can arise is that of coating of electrodes by metal vapourised from the surface of the weld pool. Metal ions and oxides are accelerated towards and adhere to the surface of the electrode.

An object of the present invention is to tend to provide a construction of electrode, wherein the above problem is mitigated.

SUMMARY OF THE INVENTION

According to the present invention, an electrode for welding comprises an elongate body having a tapered tip terminating at a circular flat end of about 1 mm diameter and at least one cavity at one end thereof. The geometry of the cavity may take the form of a slot, rectangular in transverse section, extending from the flat end in an axial direction into the tapered tip for a major part of the length of the taper.

DESCRIPTION OF THE DRAWINGS

Embodiments of the present invention will now be described by way of example only with reference to the accompanying drawings, in which.

DESCRIPTION OF PREFERRED EMBODIMENTS

Figure 1:
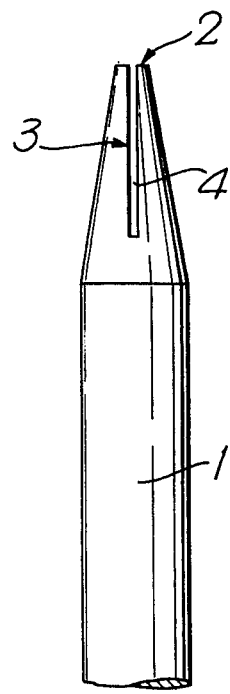
FIG. 1 is a fragmentary side view of an electrode.
Figure 2:
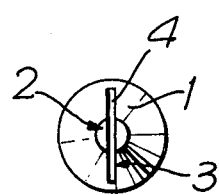
FIG. 2 is a plan of FIG. 1, and
FIGS. 3 and 4 are plan views, showing further constructions.

Reference is directed to the drawings, in which like reference numerals indicate like parts. Referring firstly to FIGS. 1 and 2, these illustrate an electrode indicated by the reference numeral 1. Such an electrode is shaped in a similar manner to a pencil, and has a diameter of about 4 mm and a length of about 9½ cm. At its end 2 closest to a weld, the electrode is tapered down to a circular point of only 1 mm diameter. Tapering begins about 1.25 cm away from the point.

To provide the electrode 1 with a cavity, the construction shown in FIGS. 1 and 2 envisages a rectangular slot 3 formed in the electrode 1. The slot 3 is arranged across a diameter of the electrode and extends in an axial direction about 6 mm away from the end 2. The slot 3 (see FIG. 2) has one dimension smaller and the other dimension greater than the diameter of the end 2. Owing to the presence of the slot 3, there is formed a cavity 4 in the electrode in the region of its welding point, which cavity 4 is formed by an enclosure on two sides.

The slot 3 can be produced by any suitable technique, for example by removal of material employing spark erosion or a laser, cutting wheel or electron beam. Alternatively, the electrode with slot can be preformed by extrusion, sintering, casting or swaging. A combination of preforming and finishing by removal of material can be employed if desired. The slot 3 is shown terminating within the tapered tip of the electrode and penetrating the tapered walls of the tip over substantially the full axial extent of the slot.

Figure 3:
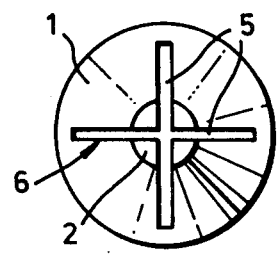
Figure 4:
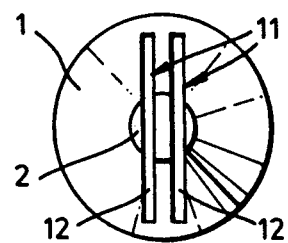

In a further construction embodying the invention, the electrode 1 has a cruciform slot 5, see FIG. 3, giving a multi-sided cavity 6. A further construction envisages cavities 11 provided by multi-slotting (see FIG. 4 which shows two parallel slots 12).

Electrodes such as those described above find application in tungsten inert gas welding. When such welding is carried out in an enclosed space, there is less chance of dispersal of metal vapourised from the surface of the weld than would exist in the atmosphere. Therefore, metal ions and oxides are accelerated towards and adhere to the surface of the tungsten electrode under influence of electric fields. It will be appreciated that the electric field generated by the high voltage, high frequency spark start unit is in the region of $6 \times 10^4$ V cm$^{-1}$ and the cathode fall region of the arc column electric field may exceed $10^9$ V cm$^{-1}$. Deposits, such as chromium-rich deposit, formed upon the electrode when welding, can be a problem in that thermionic emission from the electrode is suppressed by the deposit so that arc initiation may be impaired. Therefore, deterioration of electrode performance takes place as the tip of the electrode is coated. This may be due to the increasing time over which the high frequency spark unit, used to initiate the spark, has to operate before the arc is established. Once formed, deposit thickness at the electrode tip increases and spreads from the tip along the electrode towards an electrode holder (not shown) until eventually emission from the electrode is terminated and erratic arc initiation occurs.

However, with the structure of electrode described above, the problem of deposit is mitigated because the cavity or cavities forms or form a clean deposit-free space wherein spark initiation can take place. Owing to the complex geometry of the electric field in the vicinity of the electrode, deposits do not tend to be attracted into the cavity, or each of them, which remains clean of deposit. Thus there is nowhere for the deposit to spread from.

In order to prevent any possibility of the arc centre produced during welding moving along or around the cavity or moving from one to another where there is more than one, orientation can be adjusted until there is parallelism or symmetry between the cavity or cavities and the axis of the joint to be welded.

I claim:

1. A non-consumable electrode for low current tungsten inert gas welding having a tapered tip terminating at a circular flat end of about 1 mm diameter, characterized in that a rectangular slot having, in transverse section as viewed axially of the electrode, one dimension smaller and the other dimension greater than the end diameter extends from the flat end in an axial direction into the tapered tip for a major part of the length of the taper so that, in use, spark initiation can take place from locations on the electrode from which metal ion deposition has been inhibited.

2. An electrode as claimed in claim 1 wherein said slot terminates within said tapered tip of the electrode.

3. An electrode as claimed in claim 1 wherein said slot penetrates the tapered walls of said tapered tip over substantially the full axial extent of the slot.

4. An electrode as claimed in claim 1 including two of said slots.

5. An electrode as claimed in claim 4 wherein said slots are generally parallel.

6. An electrode as claimed in claim 4 wherein said slots intersect to form a cruciform slot as viewed axially.

* * * * *